Sept. 20, 1938. F. A. HOLBY Re. 20,863

TANK TRUCK

Original Filed April 3, 1933 9 Sheets-Sheet 1

Inventor

Frank A. Holby.

By Cushman, Darby & Cushman

Attorneys

Sept. 20, 1938. F. A. HOLBY Re. 20,863

TANK TRUCK

Original Filed April 3, 1933 9 Sheets-Sheet 2

Inventor

Frank A. Holby.

By Cushman, Darby & Cushman

Attorneys

Sept. 20, 1938. F. A. HOLBY Re. 20,863

TANK TRUCK

Original Filed April 3, 1933 9 Sheets-Sheet 3

Inventor

Frank A. Holby.

By Cushman, Darby & Cushman

Attorneys

Sept. 20, 1938. F. A. HOLBY Re. 20,863

TANK TRUCK

Original Filed April 3, 1933 9 Sheets-Sheet 4

Inventor

Frank A. Holby

By Cushman, Darby & Cushman, Attorneys

Sept. 20, 1938.

F. A. HOLBY

Re. 20,863

TANK TRUCK

Original Filed April 3, 1933 9 Sheets-Sheet 5

Inventor

Frank A. Holby

By Cushman, Darby & Cushman

Attorneys

TANK TRUCK

Original Filed April 3, 1933 9 Sheets-Sheet 6

Inventor

Frank A. Holby.

By Cushman, Darby & Cushman

Attorneys

Sept. 20, 1938. F. A. HOLBY Re. 20,863

TANK TRUCK

Original Filed April 3, 1933 9 Sheets-Sheet 7

Inventor

Frank A. Holby

By Cushman, Darby & Cushman

Attorneys

TANK TRUCK

Original Filed April 3, 1933 9 Sheets-Sheet 8

Inventor
Frank A. Holby.
By Cushman, Darby & Cushman
Attorney

Sept. 20, 1938. F. A. HOLBY Re. 20,863
TANK TRUCK
Original Filed April 3, 1933 9 Sheets-Sheet 9
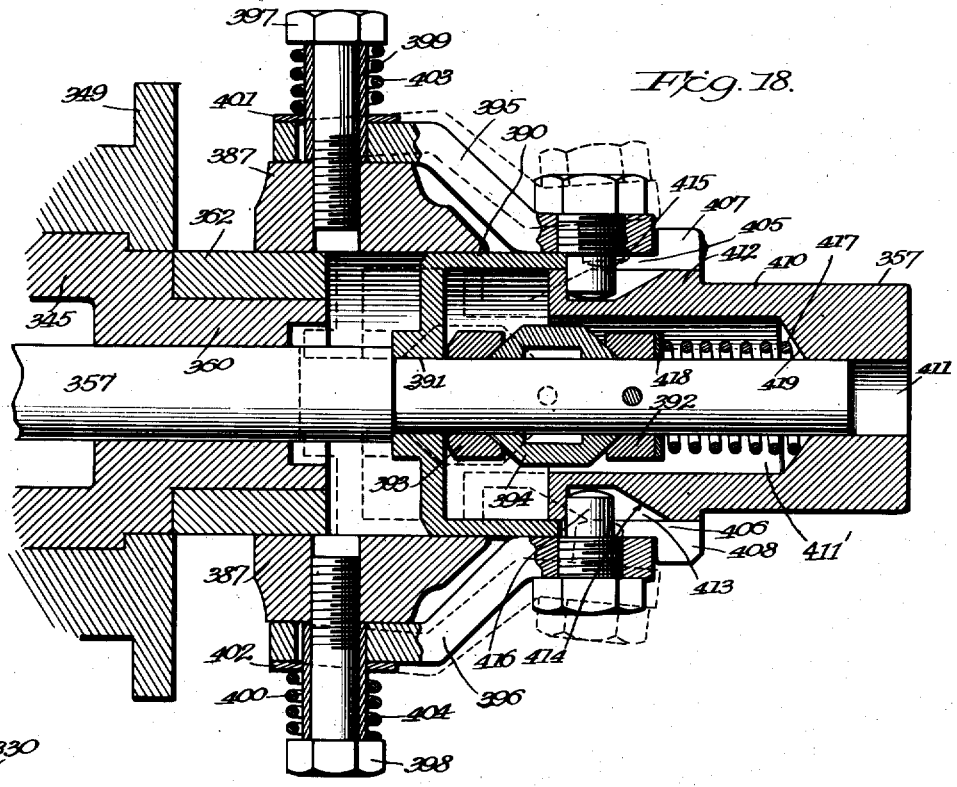
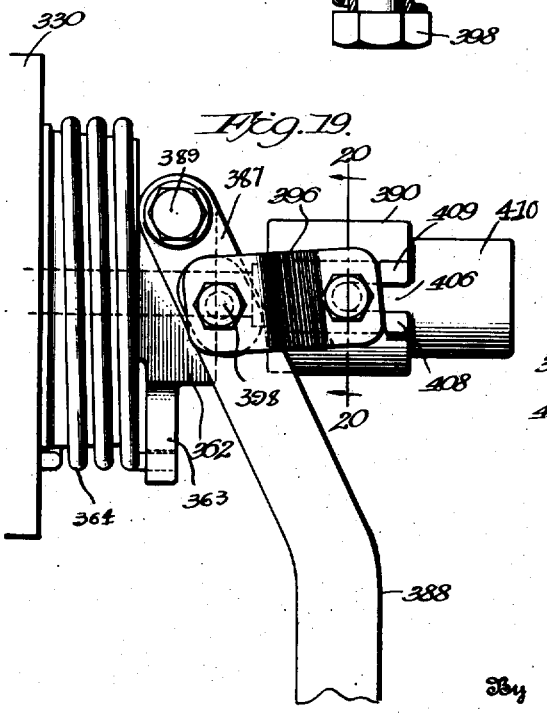
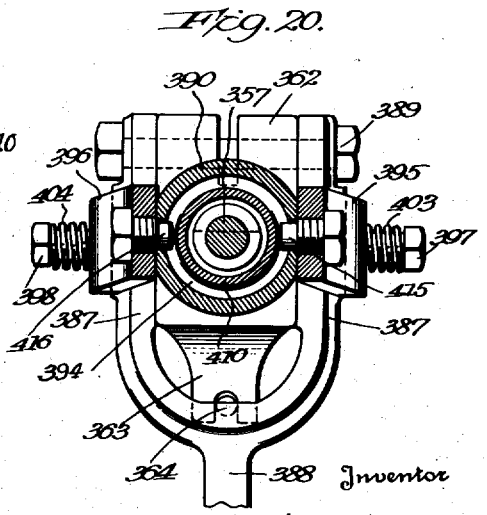
Inventor
Frank A. Holby.
By Cushman, Darby & Cushman
Attorneys Reissued Sept. 20, 1938

Re. 20,863

UNITED STATES PATENT OFFICE 20,863

TANK TRUCK

Frank A. Holby, Riverside, Conn., assignor, by mesne assignments, to The William F. Kenny Company, New York, N. Y., a corporation of New York Original No. 2,037,020, dated April 14, 1936, Serial No. 664,255, April 3, 1933. Application for reissue November 2, 1937, Serial No. 172,471

26 Claims. (Cl. 137—21)

The present invention relates to tank trucks and has to do particularly with specific features of tank construction, with means for mounting the tank on a chassis and to a discharge system for the tank.

According to the invention, a positive pump discharge is contemplated, the discharge pump being preferably driven by a hydraulic motor which, in turn, is driven from a source of fluid pressure preferably in the form of a master pump driven by the truck propelling motor. The main tank is preferably divided into a number of tank compartments from any one of which fluid may be withdrawn by the proper adjustment of a selector and control valve, the selector valve controlling pressure responsive devices adapted to connect the selected tank with a manifold running to the discharge pump, and the control valve being operable to control the supply of pressure fluid to the discharge pump drive motor.

In addition the invention includes safety provisions whereby discharge is instantaneously interrupted upon arising of certain contingencies.

It may be stated briefly that the main purposes of the invention are to provide a construction combining maximum transportation capacity, maximum facilities for quick loading and unloading and the utmost safety and simplicity of operation.

Without further general reference to the features of the invention, I shall proceed to describe, by way of illustration, a practical embodiment thereof, the specific description to be made with reference to the accompanying drawings. In these drawings.

Figure 3:
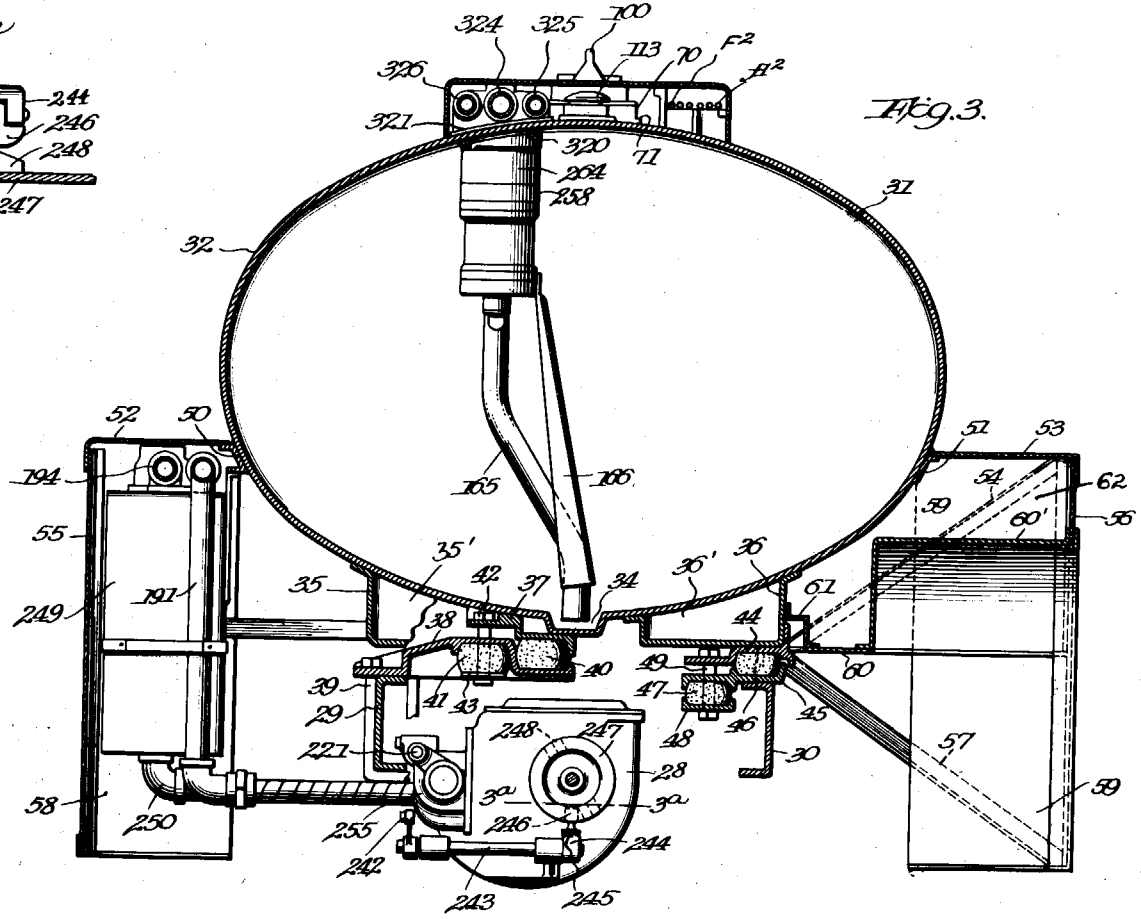
Figure 3 is a section substantially on line 3—3 of Figure 2.
Figure 3A:
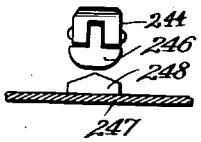

Figure 3*a* is a section substantially on line 3*a*—3*a* of Figure 3.

Figure 4:
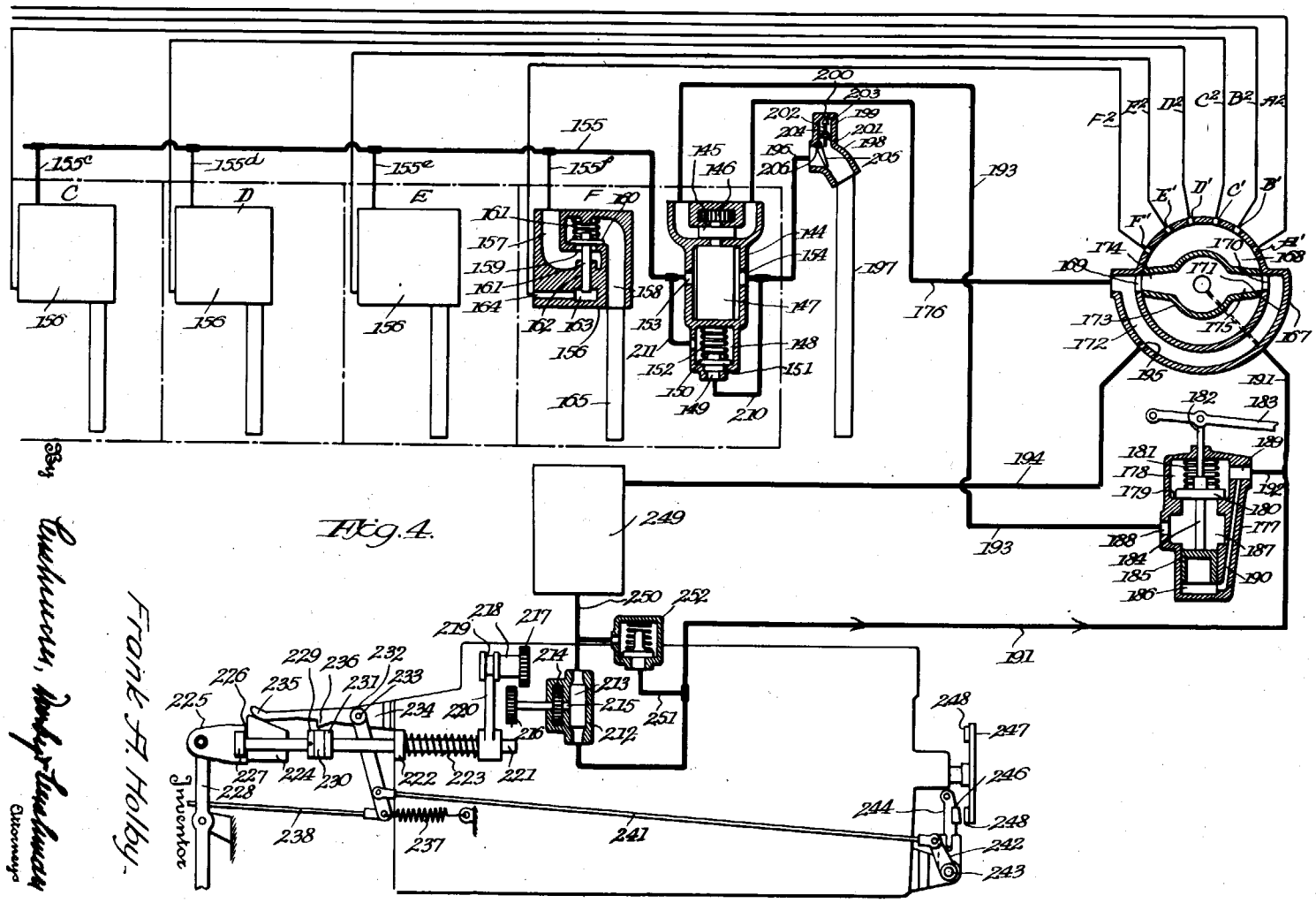

Figure 4 is a diagram illustrating the tank discharge system and including the control means and main safety provisions.

Figure 5:
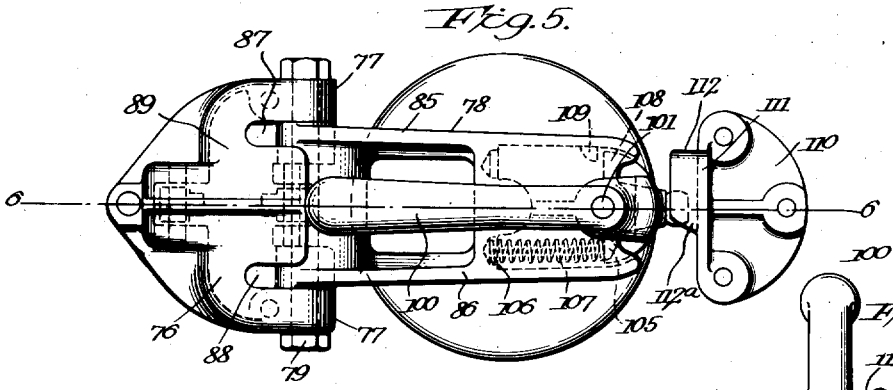

Figure 5 is a plan view of a locking means for a hand hole closure.

Figure 6:
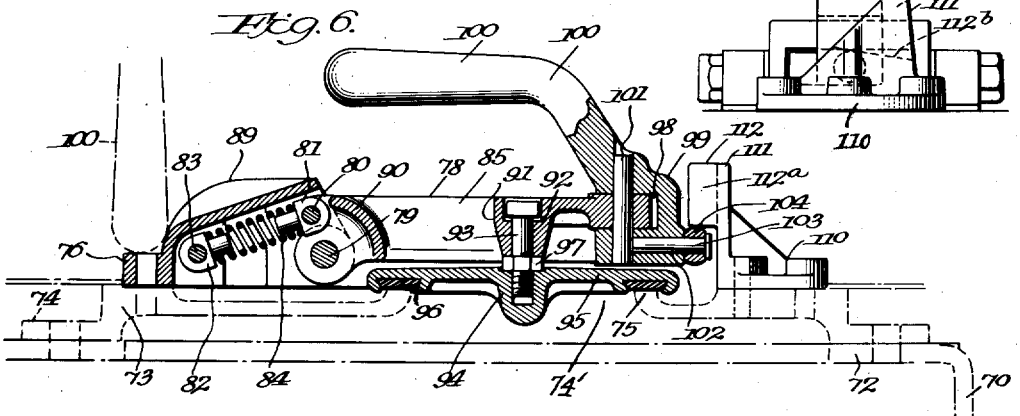

Figure 6 is a section substantially on the line 6—6 of Figure 5, but showing also the hand hole closure.

Figure 7:
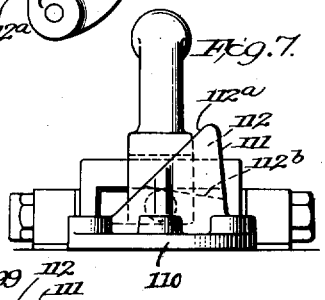

Figure 7 is an elevation of the devices of Figure 5, as seen from the right of the latter figure.

Figure 8:
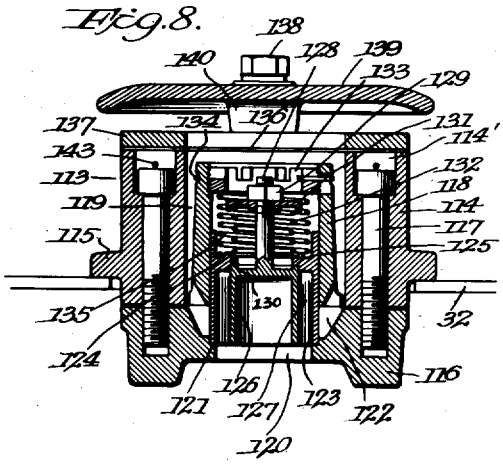

Figure 8 is an axial section of a two-way vent and pressure relief valve.

Figure 9:
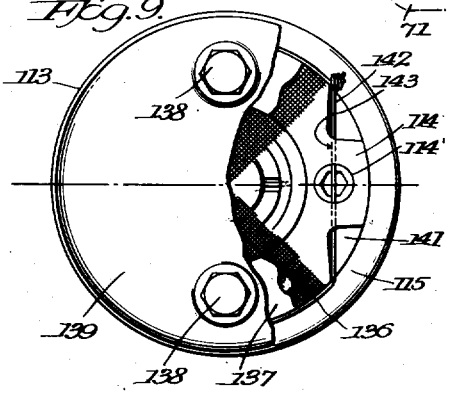

Figure 9 is a plan view of the valve of Figure 8 with parts broken away.

Figure 10:
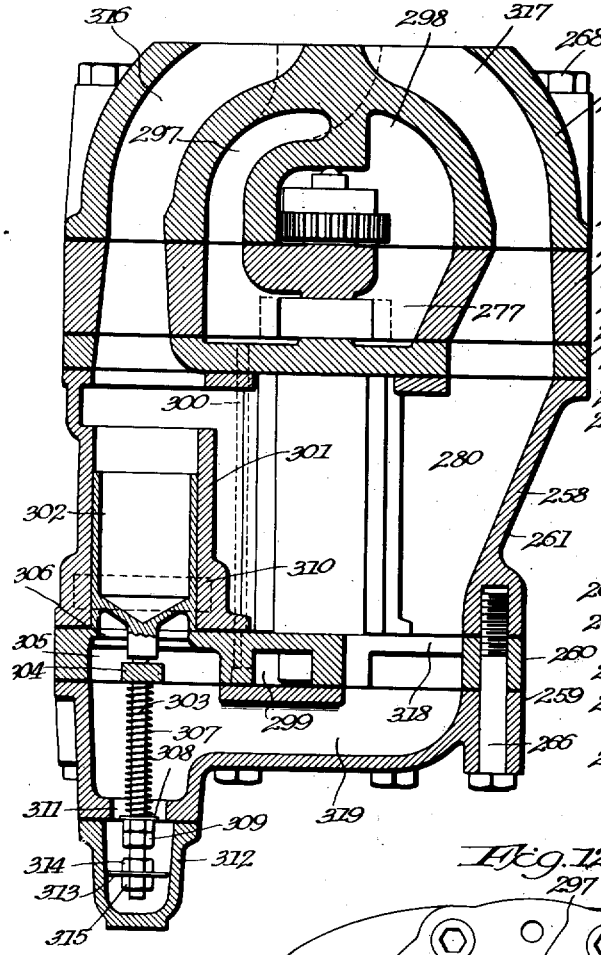

Figure 10 is an axial section of a combined motor, discharge pump and bypass unit.

Figure 11:
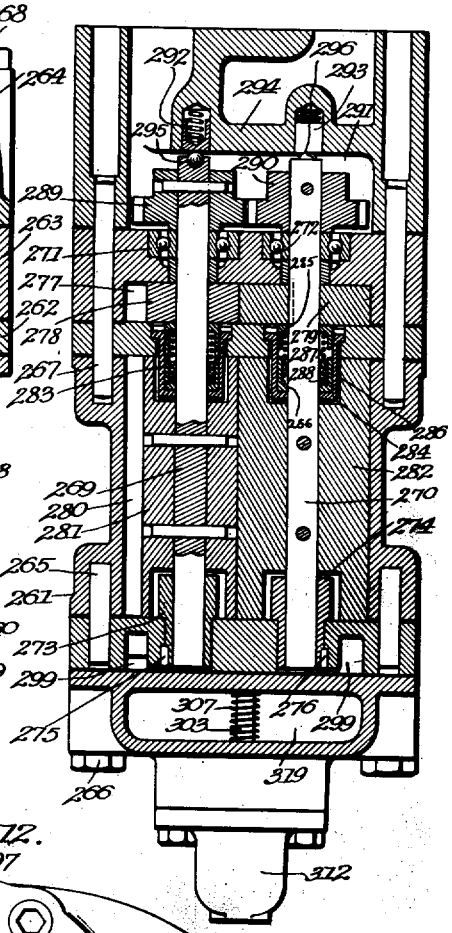

Figure 11 is another axial section of the device of Figure 10.

Figure 12:
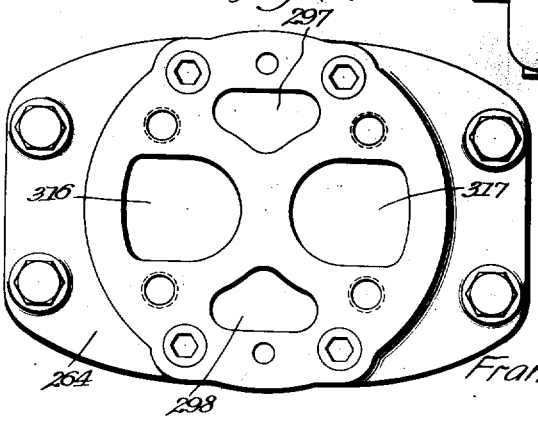

Figure 12 is a plan view of the device of Figure 10.

Figure 13:
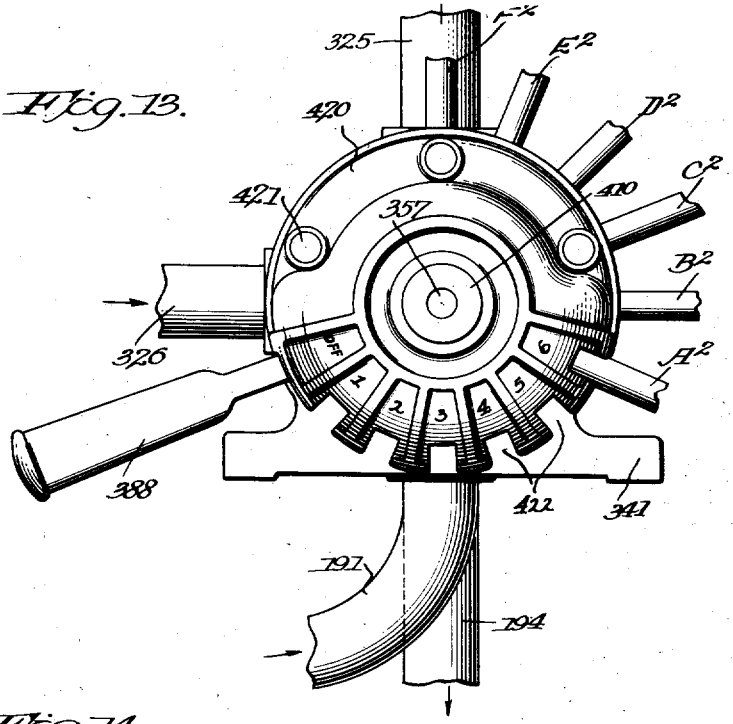

Figure 13 is an elevation of a combined selector and control valve.

Figure 14:
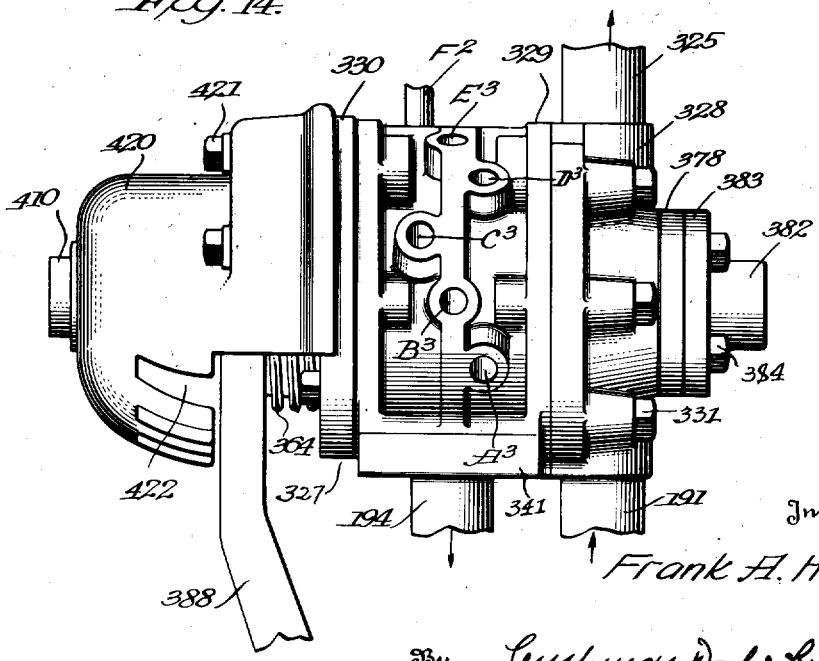

Figure 14 is an elevation of the valve of Figure 13.

Figure 15:
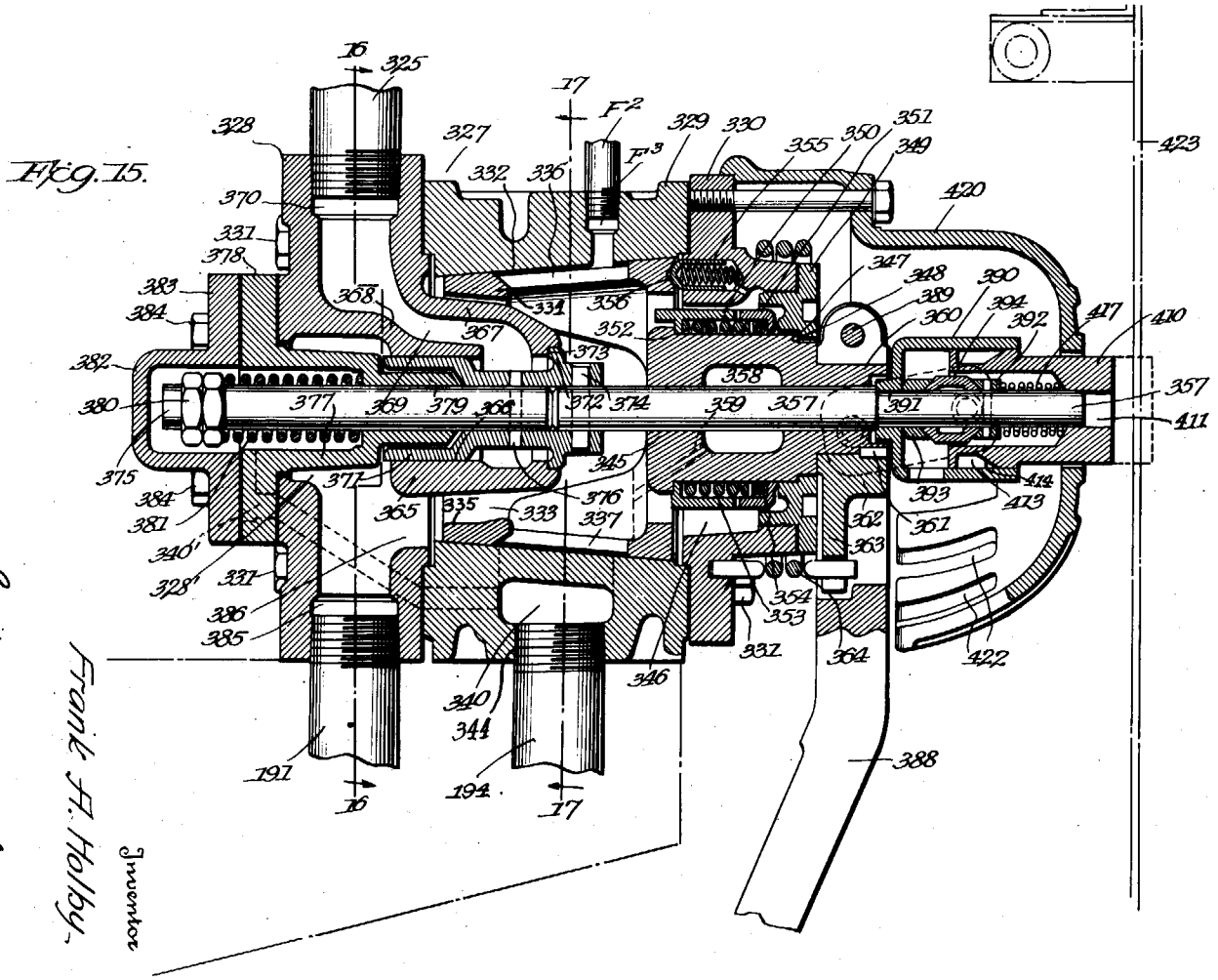

Figure 15 is an axial section of the valve of Figure 13.

Figure 16:
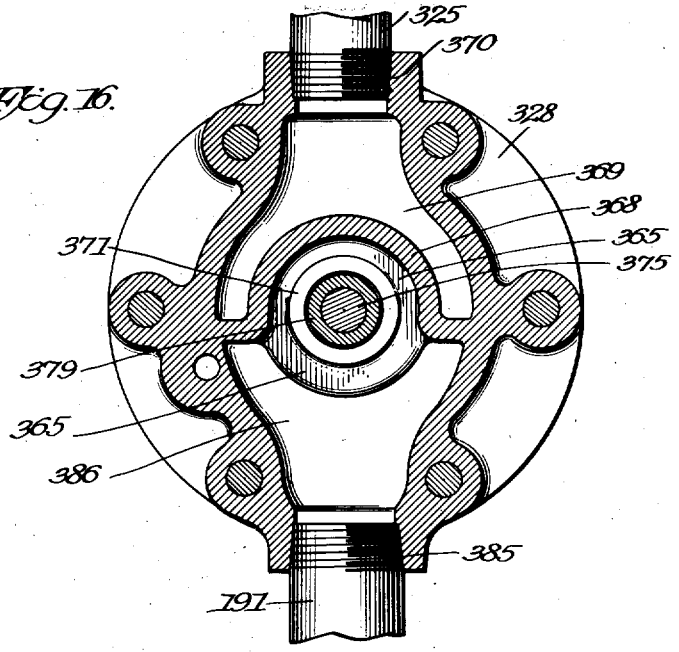

Figure 16 is a section on line 16—16 of Figure 15.

Figure 17:
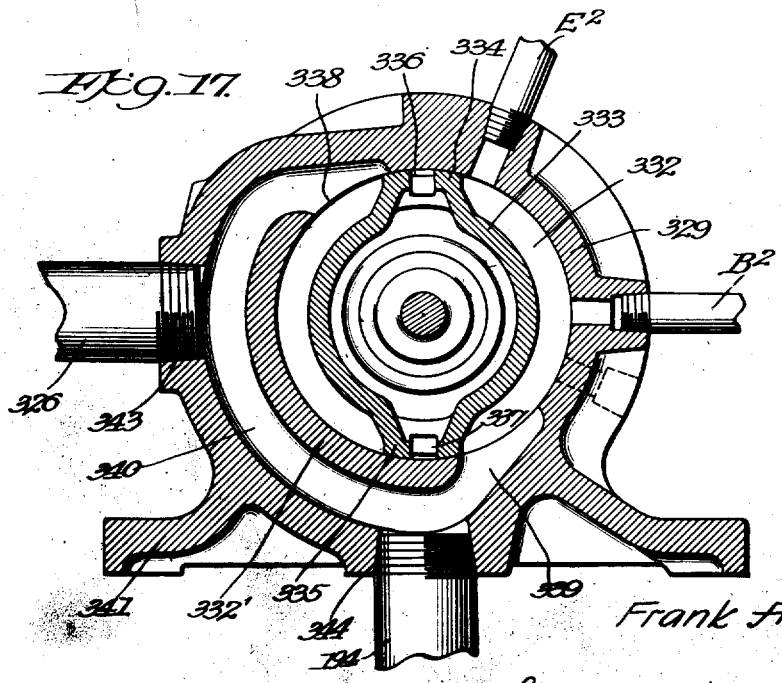

Figure 17 is a section on line 17—17 of Figure 15.

Figure 18 is an enlarged axial section taken at one end of the valve of Figure 13.

Figure 19 is an enlarged elevation of one end of the valve of Figure 13 with parts removed, and Figure 20 is a section on line 20—20 of Figure 19.

Referring to the drawings, reference numeral 25 designates generally a wheeled chassis including an engine compartment 26, a cab 27, transmission mechanism 28 and longitudinal frame members in the form of channels 29 and 30, Figure 3, these channel members being preferably sprung on the wheel axles. This construction is all of usual design and need not be specifically described for the purposes of the present application. The transmission 28, it may be stated, has the usual power take-off provisions, these being utilized in the manner to be later on described.

A main tank 31 extends above the channel members 29 and 30 longitudinally thereof for support thereby. The tank is preferably made from a single wrapping sheet 32 and is divided into a number of tank compartments, this number being six as here shown, by means of dished bulkheads 33, these being provided with peripheral flanges 33′ which are continuously welded to the inside of the wrapper sheet and contribute considerably to the rigidity of the latter. Each compartment has a small well 34 in its bottom wall, Figures 1 and 3.

Referring particularly to Figure 3, two U-shaped channel members 35 and 36 are welded to the bottom of the tank and extend substantially throughout the length of the latter, the ends of these channel members being closed by end walls as at 35' and 36', thus enabling them to be utilized as auxiliary tanks for the transportation of oil or other fluids.

Adjacent the front end of the tank, the latter has welded thereto a saddle member 37. Only one-half of this saddle member is shown in Figure 3, the remaining portion being a duplicate of that illustrated. Beneath the saddle member a bolster 38 is secured across channel members 29 and 30 by means of U-bolts as at 39. The saddle member and bolster define between them pockets in which are received suitably compressible rubber blocks as at 40, these blocks lying close to the central longitudinal vertical plane of the vehicle and being spaced at opposite sides thereof. Outwardly of blocks 40, the bolster presents downwardly faced pockets in which are received similar blocks as at 41. Stirrup members as at 43, connected to the saddle member by bolts as at 42, support blocks 41, each block 41 thus cooperating with the block 40 on the other side of the vehicle in resisting rolling tendencies of the tank. Sufficient clearance is present between saddle member 37 and the bolster 38, so as to permit relative movement of the two to the extent permitted by the cushion blocks. There may be two or more each of blocks 40 and 41 as conditions may require.

Substantially over the rear axle of the vehicle, members 35 and 36 have brackets as at 44 secured thereto and beneath these brackets are secured, to the longitudinal members 29 and 30, brackets as at 45. Brackets 44 and 45 define between them pockets receiving compressible blocks as at 46. Inwardly of the blocks 46 and below brackets 45 are disclosed additional blocks 47, these being supported on stirrup members 48 connected to brackets 44 by bolts as at 49.

It will be noted that blocks 46 are substantially widely spaced as compared to blocks 40. The arrangement is such that blocks 40 and 46 form, in effect, a three-point support for the tank, so that the latter is preserved to a great extent from torsional stresses which might otherwise be communicated thereto. It will be understood that the weight of the tank is supported by blocks 40 and 46 on the longitudinal chassis members, blocks 41 and 47 cooperating with the first named blocks in absorbing lateral rolling tendencies of the tank.

Extending along and secured to the sides of the tank below its central horizontal plane are a pair of angle strips 50 and 51 presenting substantially horizontal flanges. Plates 52 and 53 have their inner edges supported on these flanges, the outer edges of the plates being supported by braces as at 54. Side plates 55 and 56 extend downwardly from plates 52 and 53, the lower edges of these plates being supported by braces as at 57. The ends of the angle units constituted by plates 52, 55 and 53, 56 are closed by plates as at 58 and 59, the plate 58 serving as front wall of a compartment which houses a pressure fluid reservoir hereinafter mentioned.

A substantially horizontal plate 60 extends beneath plate 53 substantially from end to end of the latter and projects beneath the lateral overhand of the main tank with its inner marginal portion welded beneath the outer lower marginal portion of the bottom of auxiliary tank 36, the outer edge of plate 60 being welded to plate 56. Above the rear wheels plates 56 and 60 are provided with cut-outs, which are closed by a wheel hood 60' and a cut-out in plate 60 providing clearance for bracket 44 is closed by a hood 61. Plate 59, which is to the rear of braces 54 and 57, has an upper portion entirely closing the space between the main tank, tank 36, and plates 53 and 56, and a similar closure plate connects the rear ends of these members to form a closed tank 62. Plate 60 may be slightly rearwardly inclined, free flow from the front of tank 62 to the rear being permitted in the space between hoods 60' and 61. The portions of plates 56 and 59 below plate 60 serve as shields or aprons.

Tank 62 is preferably utilized for the transportation of lubricating oil or other comparatively non-inflammable fluid to be transported. A similar tank, beginning to the rear of the reservoir above mentioned, is preferably provided on the other side of the vehicle. All of the auxiliary tanks may be internally and externally reinforced as desired.

Figures 1, 2:
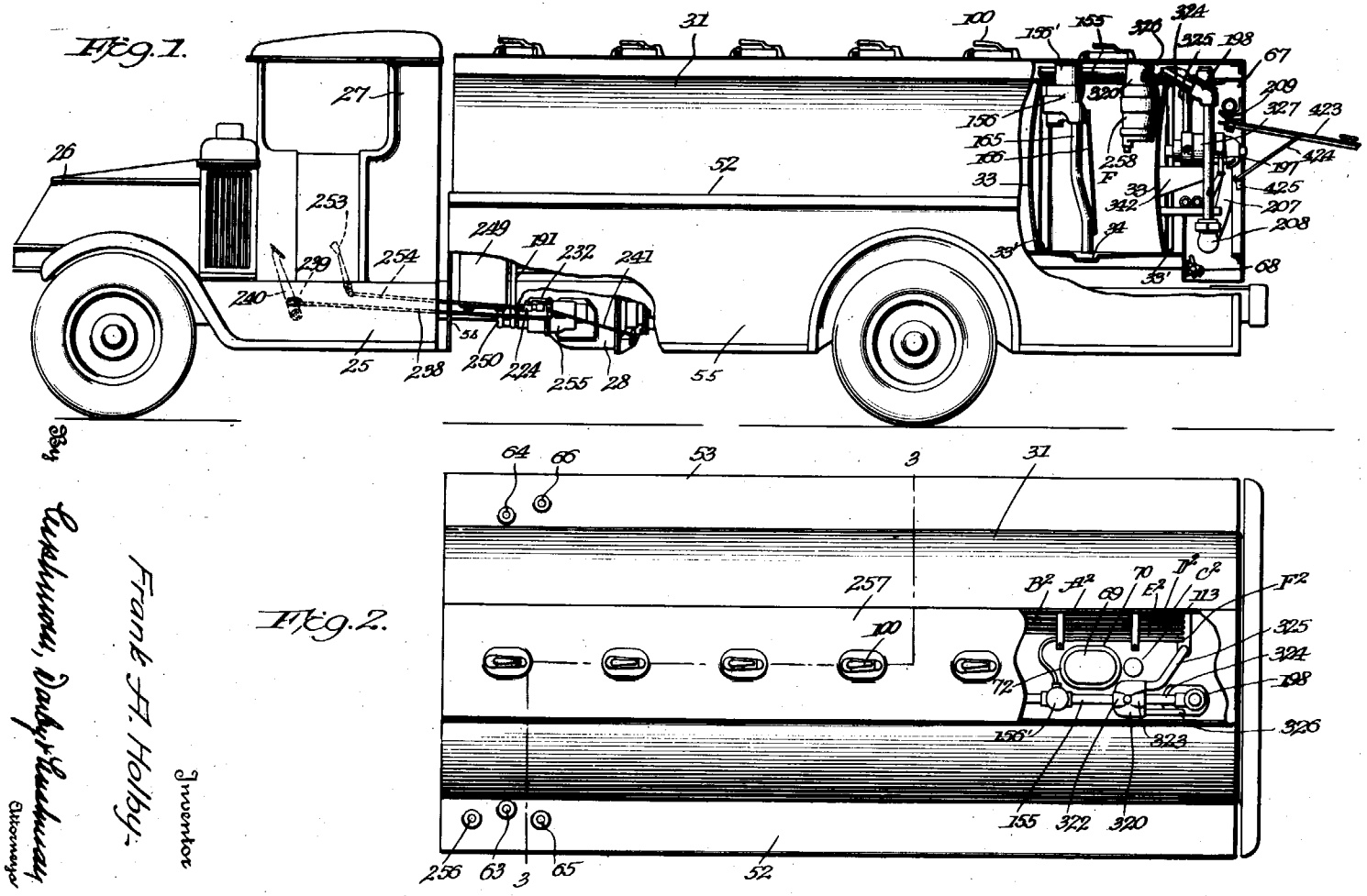
Figure 1 is a side elevation with parts broken away to reveal others of a tank truck constructed in accordance with the present invention.
Figure 2 is a plan view of the tank with parts broken away.

Preferably, the auxiliary tanks are filled from the forward end of the vehicle. In Figure 2, reference numeral 63 designates a screw plug in the end of a tube extending from the top of runway 52 into the tank defined by channel member 35 and reference numeral 64 designates a similar plug closing the end of a filling pipe for the tank defined by channel member 36. Reference numerals 65 and 66 designate closure plugs or filling pipes running to the side tanks as at 62. Drain faucets for the auxiliary tanks are provided in a compartment 67 at the rear of the tank, one of these faucets being shown at 68, Figure 1.

Each tank compartment is provided at its top with a hand hole and with a two-way vent and pressure relief valve. In Figure 2, reference numeral 69 designates the hand hole for the rearmost tank compartment F, Figure 1. A collar 70 is welded to the tank above opening 69, the collar being provided with an outwardly extending peripheral flange 71, Figures 3 and 6, which conforms to the curve of the tank and is welded to the latter. Collar 70 has a top inwardly directed flange 72, Figures 2 and 6, the top of this flange lying in a horizontal plane.

Referring particularly to Figures 5, 6 and 7, reference numeral 73 designates generally a hand hole cover provided with a peripherial flange 74 secured against the top of flange 72 by riveting and welding, this cover having formed therein a circular opening 74' surrounded by an upstanding wall 75. A hollow block 76 secured to cover 73 presents knuckles 77 between which is supported an arm 78 for pivotal movement about a horizontal bolt 79. Pivoted to arm 78 on a pin 80 parallel to bolt 79 is a stud 81, a similar stud 82 being pivoted in block 76 on a pin 83. The studs have reduced ends engaged in the ends of a compression spring 84, which latter bears against shoulders at the ends of the reduced portions. Spring 84 in the position of parts shown, particularly in Figure 6, tends to move arm 78 downwardly. Upon lifting the arm, however, the axis of pin 80 is adapted to pass below the axis of bolt 79, so that spring 84 tends to hold arm 78 in upwardly extending position. Arm 78 is reinforced by longitudinally extending ribs 85 and 86, these being accommodated in the upwardly extending position of the arm in recesses 87 and 88 formed in the top wall 89 of the block 76. An arcuate guard 90 connecting ribs 85 and 86 in concentric relation with bolts 79 and adjacent thereto moves under wall 89 without interference therewith as arm 78 is moved upwardly.

Arm 78 is provided with a boss 91 having a bore 92 concentric with the opening 74', the bore receiving a bolt 93 whose lower threaded end is engaged in a bore provided in a central boss 94 of a circular cap 95, the cap having an annular recess adapted to overlie circular wall 75 and undercut to retain therein a compressible washer 96. The head of bolt 93 is received in a counterbore at the top of bore 92 and a nut 97 locks the bolt with cap 95. The relation of parts is such that bolt 93 in addition to being rotatable in bore 92 is also longitudinally movable therein to a limited extent.

At its free end, arm 78 extends into a recess 98 formed in a boss portion 99 of a lever 100, the two parts being connected by a pivot pin 101, which is perpendicular to arm 78. The boss portion has a bore 102 perpendicular to pin 101 and having fixed therein a headed pin 103 upon which is revolubie a roller 104.

Interposed between a wing 105 of boss 99 and an abutment surface 106 of arm 78 is a compression spring 107, which tends to rotate the boss 99 and lever 100 in a counter-clockwise direction about pin 101, Figure 5. A wing portion 108, opposite wing 105, is adapted to cooperate with an abutment 109 formed on the arm 78 to limit rotation of the lever under the influence of spring 107.

A bracket 110 secured to plate 73, at the free end of arm 78, has an upstanding portion 111 presenting a latch block 112 for cooperation with roller 104. Block 112 is triangular in shape, as may be most clearly seen in Figure 7, having a top inclined surface 112*a* and a bottom inclined surface 112*b*. When the arm is moved downwardly to bring cap 95 over opening 74', roller 104 strikes surface 112*a* and is cammed to the left thereby, Figure 7, so that the roller under the influence of spring 107 is engaged under surface 112*b*, the inclination of the latter being such that the roller in moving therealong, securely presses the gasket 96 against the top of wall 75.

Cap 95 is held closed under the influence of springs 84 and 107, the former acting directly at the center of the cap, the mounting of the latter, above described, enabling it to seat itself to the best advantage on wall 75. In the open position of the cap wherein it is held by the toggle arrangement 81, 82, 84, the end of handle 100 rests against the base of block 76 as shown in dotted lines in Figure 6, thus limiting the opening movement of the arm 78. The pivot bolt 79 of arm 78 extends transversely of the truck and the holding effect of spring 84 is sufficiently delicate, so that any movement of the truck will suffice to overcome the force of the spring, enabling it to swing arm 78 downwardly, roller 104 automatically engaging under block 112.

Each tank compartment is provided with a two-way vent and pressure relief valve, that associated with tank compartment F being designated at 113, Figures 2 and 3, and shown in detail in Figures 8 and 9. Each equalizing valve 113 comprises a tubular portion 114 provided with an annular rib 115, which rests upon and is welded to the tank shell 32 about an aperture in the shell through which the lower portion of the tubular element extends. A lower cap member 116 is bolted to the bottom of member 114 by means of socket headed bolts 117, whose heads are set in counterbores 114' at the top of element 114. Member 116 has an upwardly extending neck 118 within member 114 and spaced from the inner wall of the latter to provide an annular space 119. Cap 116 is provided with an aperture 120 in its lower wall, the upper margins of which are rabbeted to form an annular ledge or seat 121, the base of neck 118 being provided with passages 122 which communicate space 119 with the interior of the neck, passages 122 debouching above ledge 121.

A sleeve valve 123 is slidable in neck 118, the lower edge of the valve being normally seated on ledge 121, so as to close passages 122. Sleeve valve 123 has an inwardly extending annular rib 124, whose lower inner edge is rabbeted to provide a seat 125 against which is seated a second sleeve valve 126, which is slidable relative to valve 123 and guided by ribs as at 127 formed in the interior of the latter and extending longitudinally thereof. Valve 126 has an upwardly extending stem 128 upon whose upper extremity is threaded and locked a nut 129. Interposed between a rabbeted seat 130 formed on the upper inner edge of ledge 124 and a washer 131 on stem 128 beneath nut 129, is a compression spring 132, which normally acts to hold valve 126 against its seat 125. A crenellated ring nut 133 is threaded in the upper end of neck 118 and locked therein by means of a wire 134. Engaged between nut 133 and a depressed seat formed in the top of ledge 124 is a compression spring 135, which normally acts to hold valve 123 on its seat 121.

A fine mesh screen 136 is engaged between the top of element 114 and a ring 137 secured to the latter by means of cap screws 138, which also serve to secure in position a cap 139, the cap screws passing through spacing bosses as at 140, which overlie ring 137. Finally, at either side of counter-bores 114' the exterior of tubular element 114 is notched as at 141, Figure 9, and a sealing wire 142 is passed through bores 143, which connect the adjacent notches and intersect counter-bores 114'. The sealing wire prevents undetected disturbance of bolts 117.

Springs 132 and 135 are set as required by initial adjustment of nuts 129 and 133 respectively. It will be evident that upon the occurrence of a negative pressure within the tank compartment atmospheric pressure will move vent valve 126 downwardly, unseating it and connecting the tank interior momentarily with the atmosphere. Upon the occurrence of an excessive pressure in the tank compartment pressure relief valve 123 will be moved upwardly, uncovering passages 122 and thus connecting the tank with the atmosphere. Due to the position of the sealing wires 134 and 142, it will be evident that the initial setting of the valve cannot be disturbed without detection.

The hydraulic tank discharge system will first of all be more or less generally described with particular reference to the diagram of Figure 4. The main tank is considered to be divided into six tank compartments A to F, of which C to F appear in Figure 4. In tank F, which is the rearmost, is disposed a combined motor and pump unit, designated generally by the reference numeral 144. Reference numeral 145 designates one of a pair of rotary motor pistons, these being connected together by means of pilot gears, of which one is shown at 146. Mounted on the shafts of the motor pistons are a pair of similar pump pistons, one being shown at 147. Below the pump compartment, and preferably in the same casing with the motor and pump, is a chamber 148 having a bottom opening 149 closed by a valve disc 150, which is seated on an annular ledge 151 at the bottom of chamber 148 by means of a compression spring 152.

The pump casing has an intake opening 153 and a discharge opening 154. A manifold 155, which extends above all of the tank compartments, is connected into the inlet opening 153 and has branches 155c, 155d, 155e and 155f connected to the outlet openings of valve housings 156. The valve housing 156 in compartment F, is shown in cross-section and will be particularly described, it being understood that the remaining valve housings 156 and appurtenant parts are identical.

The outlet opening of the valve housing 156 in compartment F to which branch 155f is connected is designated by the reference numeral 157. The housing provides an inlet passage 158, which has a horizontal portion above a horizontal portion of passage 157, the two passages being connected through an aperture 159. A valve disc 160 seats on the upper margins of aperture 159 and has a stem 161 fixed thereto and guided in a bore 162 in the valve housing, the lower end of the stem projecting into a chamber 163 in the valve housing. A duct 164 connects chamber 163 with the valve housing exterior.

Valve 160 is normally held in seated position by means of a compression spring 161 interposed between it and the valve housing wall thereabove. However, the valve is adapted to be unseated in response to pressure introduced into chamber 163 and acting on the lower end of stem 161. A suction pipe 165 extends downwardly from inlet opening 158 with its lower end adjacent the bottom of the tank and above well 34, Figure 1, the suction pipe being steadied by a brace 166 welded at its upper end to the housing 156 and at its lower end to the pipe.

A selector valve 167 has a casing providing a cylindrical chamber 168 pierced at diametrically opposite points by relatively large apertures 169 and 170. At six equally spaced points between openings 169 and 170, the upper wall portion of chamber 168 is provided with apertures A1 to F1, the lower portion of the chamber being surrounded by a wall 171, which, with side walls forming parts of the casing, defines a passage 172 connecting ports 169 and 170.

Rotatable within the chamber 168 is a valve plug 173, which has the hollow diametrically opposed spout portions 174 and 175 whose ends have a close running fit with the walls of chamber 168. A tube F2 connects port F1 with duct 164 and tubes A2 to E2 connect ports A1 to E1 with similar ducts of the other valve housings 156. The outlet sides of the hydraulic motor is in communication with passage 172 of the selector valve by means of a tube 176.

A control valve 177 has an upper chamber 178 presenting a ledge 179 upon which is seated a valve disc 180 by means of a compression spring 181 interposed between the valve and the top wall of the chamber. A stem portion 182, fixed to valve 180, projects through the top wall of chamber 178 and has pivoted thereto an operating lever 183. A stem portion 184 fixed to valve 180 and projecting downwardly therefrom has secured to its lower end a piston 185 reciprocable in a chamber 186. Between valve 180 and piston 185 is a chamber 187, provided with a port 188. A port 189, connected into chamber 178, is connected by means of a passage 190 to chamber 186 below piston 185.

Reference numeral 191 designates a pressure supply conduit which is connected into port 189 of valve 177 through a branch 192, the end of conduit 191 being connected through a suitable swivel connection to the interior of valve plug 173. Chamber 187 of valve 177 is connected by means of a line 193 to the inlet side of the hydraulic motor and an exhaust line 194 for the entire system is in connection with a port 195 formed in wall 171 of valve housing 167.

Assuming pressure fluid to be flowing in conduit 191 in the direction indicated by the arrows, pressure is exerted on the top of valve disc 180 of valve 177 and on the bottom of piston 185, the pressures substantially balancing, so that the valve disc 180 is held seated by the force of spring 181. Valve plug 173, being positioned as shown, the pressure fluid passes through spouts 174 and 175 and ports 169 and 170 to the exhaust line 194 via port 195. If the valve plug 173 is rotated in a counter-clockwise direction to bring spout 175 over orifice A1, pressure is communicated through line A2 to the valve housing 156 in tank compartment A, so that valve disc 160 is unseated and a connection is established between the suction pipe and manifold 155, which through port 153 is in connection with the intake side of the pump chamber. If lever 183 of the control valve 177 is now lifted, fluid under pressure passes through chambers 178, 187 and conduit 193 to the inlet side of the hydraulic motor to drive the latter, the motor exhaust passing through conduit 176 and valve passage 172 to the exhaust line 194.

Under these circumstances, fluid is withdrawn from tank compartment A, it being noted that the valve discs 160 in all the other compartments are held firmly seated not only by their springs 161, but also by reason of the suction existing in manifold 155 and acting on the lower faces of the valve discs.

It will be understood that upon further rotation of valve plug 173 to bring spout 175 over orifice B1, the pressure will be relieved in line A2, so that the valve disc 160 in compartment A is immediately seated by its spring 161, the valve disc 160 in compartment B being unseated in response to the pressure now existing in line B2. In stating that the pressure is relieved in line A2, it will be understood that this line, due to the described further rotation of the valve plug 173 has been placed in communication through orifices 170 and 195 with exhaust line 194.

Upon movement of valve plug 173 from its illustrated, neutral position, spout 174 is closed by the imperforate lower wall portion of chamber 168. The pressure existing in spout 174 thus substantially balances that in spout 175, so that transaxial distortive effect on the plug is obviated.

The discharge port 154 of the pump is connected by a conduit 196 with a discharge pipe 197. A fitting 198 at the upper end of pipe 197 has an upward extension 199, whose top wall is provided centrally with an orifice 200. A spider 201, in extension 199, slidably supports the stem 202 of a valve body 203, downward movement of the stem being limited by a stop 204 thereon which is adapted to rest on the spider. A flap 205 pivoted on a transverse axis 206 in fitting 198 is adapted to be lifted upon the flow of fluid through the fitting, abutting the lower end of valve stem 202 and elevating the valve body 203, so as to close orifice 200. Upon cessation of flow, flap 205 drops, permitting valve body 203 to drop, thus opening orifice 200. Valve body 203 thus acts as a spihon breaker or vent, permitting the discharge pipe 197 to drain. Referring momentarily to Figure 1, discharge pipe 197 has a length of flexible hose 207 connected to its lower end through a swivel connection 208. Hose 207, when not in use, is adapted to be supported in compartment 67 by means of brackets as at 209. As also indicated in Figure 1, fitting 198 preferably comprises separable base and cap portions.

Provisions are desirable to prevent overflow of the storage tanks into which connection is made through hose 207. With the hose making an air-tight connection with such a storage tank, means have been provided to cause the fluid to bypass through the pump when the fluid has reached a certain level in the storage tank vent pipe. When a certain predetermined head has been obtained in such a vent pipe, back pressure through conduit 196 is communicated through a branch line 210 through port 149 to the bottom of valve disc 150, lifting the latter against the force of spring 152 and permitting fluid to pass through chamber 148 and a connection 211 to manifold 155 adjacent the pump intake port 153. Hereupon, as will be understood, the pump output is merely bypassed through the pump and no further discharge to the storage tank can occur. It will be understood that the force of spring 152 can be so chosen as to take care of any discharge conditions.

As was stated at the outset, the source of hydraulic pressure for driving the discharge pump motor is preferably a master pump driven from the usual power take-off of the truck. Referring still to Figure 4, reference numeral 212 designates a master pump of the rotary piston type, one of the pistons being shown at 213 and its associated pilot gear being shown at 214. The drive shaft 215 of the pump has fixed thereto a gear 216 adapted to be engaged by a slidable gear 217 constantly in mesh with the power take-off gear. Gear 217 has an elongated hub 218 provided with an annular recess 219 engaged by a shipper member 220, the shipper member being fixed on a longitudinally slidable rod 221. Interposed between the end of the shipper member fixed to rod 221 and a fixed abutment 222, is a compression spring 223, which acts on rod 221 and the shipper member 220 to move gear 217 out of mesh with the gear 216, as shown.

The end of rod 221 opposite the shipper member is slidable in a bore provided in a cam block 224 which presents a top cam surface inclined downwardly toward the shipper member. A clevis 225 secured to the outer end of the cam block has a recess 226, which receives the headed end 227 of rod 221 with possibility of limited axial movement. Pivoted to the clevis is an actuating lever 228. Intermediate fixed abutment 222 and cam block 224, an abutment 229 is fixed on rod 221 and a washer 230 of easily fusible material is interposed between abutment 229 and a washer 231, which provides a wearing surface for a purpose to be explained. The fusible washer 230 is bonded as by slight fusion to both abutment 229 and washer 231, so that the three elements form, in effect, a unitary abutment.

A bell crank lever 232 pivoted at 233 on a bracket 234 has a nose 235, which rides on the cam surface of block 224. Intermediate its nose and pivot, the bell crank lever has formed thereon a dog 236 and at its extremity opposite nose 235 the lever has secured thereto a tension spring 237, which acts to hold nose 235 on the cam surface. Reference numeral 238 designates a rod connected through a pin and slot connection 239 with the clutch pedal 240 of the vehicle, Figure 1.

Pivoted to the bell crank lever adjacent rod 238 is a rod 241, which, at its opposite end, is pivoted to an arm 242 mounted on a rock shaft 243. Referring also to Figure 3, rock shaft 243 has fixed to its other end an articulated arm 244, the arm being articulated on an axis 245, which is perpendicular to an axial plane of shaft 243. The upper end of the arm, above the pivot point, carries a button 246 and projects behind the front companion flange 247 of the front universal joint of the truck drive. The front face of flange 247 is provided with a plurality of triangularly-shaped cams 248, see also Figure 3a, whose path of rotation is such as to enable them to engage button 246 under conditions to be hereafter described.

The inlet port of pump 212 is connected with a reservoir 249 by means of a conduit 250 and the supply conduit 191 is connected to the outlet port of the pump. In a bypass 251 between conduits 191 and 250 is arranged a pressure relief valve 252, so that pressure output not absorbed by the discharge system is merely bypassed through the master pump 212.

To place pump 212 in operation, assuming the truck motor to be running, lever 228, Figure 4, is operated to move rod 221 to the left against spring 223, thereby placing gear 217, which is constantly in mesh with the power take-off gear, in mesh with the gear 216. Upon movement of rod 221 to the left, cam nose 235 rides down on the cam surface of block 224 until dog 236 engages behind washer 231. This movement of the bell crank lever has caused rod 238 to be moved to the right, this being permitted by the pin and slot connection 239 without affecting the position of clutch pedal 240, and has moved rod 241 to the right to bring button 246 of lever 244 in close proximity to the front face of flange 247. If a cam 248 is immediately in register with button 246, joint 245, about which the upper end of lever 244 is swingable to a limited extent in either direction from its normal vertical position, permits the button to ride down one or the other of the faces of the cam in question. It will be noted from Figure 3 that the upper and lower portions of lever 244 present opposed shoulders adjacent pivot 245 and relatively weak spring interposed between these shoulders maintain the upper lever portion in its normal vertical position. It will be understood that flange 247 is stationary in view of the neutral position of the truck transmission gearing.

If, through accident or inadvertence, clutch pedal 240 is moved, as for the purpose of engaging the truck transmission gearing, the bell crank lever 232 will be swung in a clockwise direction about its pivot, thus disengaging dog 236 from washer 231. Hereupon, rod 221 is immediately moved to the left under the action of spring 223 disengaging gear 217 from gear 216 and thus arresting drive of the master pump, so that the operation of the discharge apparatus is discontinued.

Should, for any reason, as accidental release of the brake, the truck start to move in either direction, flange 247 is rotated. Such rotation results in the impingement of a cam 248 on button 246, thus, through rock shaft 243 and lever 242 moving rod 241 to the left, Figure 4, disengaging dog 236 from washer 231 and permitting the disengagement of gear 217 from gear 216.

Upon an undue rise in temperature, as in the case of fire, the collapse of the fusible washer 230 will permit movement of rod 221 to the right, block 224 acting to cam nose 235 upwardly, so that dog 236 is released from washer 231.

Under ordinary circumstances, movement of clevis 225 and block 224 to the right through actuation of lever 238 will cause the upward camming of nose 235 and release of dog 236 during the lost motion travel of the clevis and block relative to rod 221 as permitted by the previously described relation of head 227 to recess 226.

Preferably, the operating lever for rod 221 is placed in the truck cab and in Figure 1 is shown as being so positioned. In Figure 1, the lever is designated by the reference numeral 253 and its connecting rod by the reference numeral 254. Such parts as master pump 212 and gears 216 and 217 are preferably contained in a flanged housing such as is shown at 255, Figures 1 and 3, this housing being bolted to the transmission casing 28. The reservoir 249 is preferably supported under the forward end of runway 52 and provided with a filling opening 256 in plate 52, as indicated in Figure 2. The reservoir connections have the same reference numerals in Figure 3 as in the diagram of Figure 4.

It will be understood that the showing of the valve housings 156 in Figure 4 is diagrammatic, the actual form of these units being preferably as indicated in Figure 1. A lower casting has formed therein the valved fluid passage and is supported by means of a cap element 156' which is secured by welding in an opening in the tank top, manifold 155 being connected into this cap member and therethrough with the fluid passage in the lower casting. As particularly shown in Figure 2, the manifold 155 is disposed to one side of the hand holes, the pressure lines A2 to F2 being disposed at the other side of the hand holes, all of these lines being protected by a shroud 257.

Also the hydraulic motor, pump, and relief valve arrangement shown in Figure 4 is more or less diagrammatic and a preferred arrangement of these devices is more particularly shown in Figures 10 to 12, the general disposition thereof being shown in Figures 1, 2, and 3. Referring to these figures of the drawings, reference numeral 258 designates generally a casing in which is arranged the motor, pump and relief valve and communicating passages. The main part of this casing is made up of sections 259, 260, 261, 262, 263 and 264. Sections 260 and 261 are registered by means of pins 265, section 259 being secured to section 261 through section 260 by means of cap screws 266. Sections 261 to 264 inclusive are held in register by means of pins 267 and are secured together by means of cap screws 268 whose heads engage section 264 and whose threaded ends are engaged in bores in section 261. Two parallel shafts 269 and 270 are journalled in casing 258, the upper end portions of these shafts being journalled in ball bearing assemblies 271 and 272 engaged in recesses in the top of section 263. The lower ends of shafts 269 and 270 are journalled in bushings 273 and 274 which have lower reduced portions engaged in bores in section 260 and held against rotation by means of pins 275 and 276. The upper enlarged portions of the bushings rest on top of section 260.

The lower portion of section 263 has formed therein a motor chamber 277 in which are disposed a pair of rotary pistons 278 and 279 keyed to shafts 269 and 270 respectively. Pinned to shafts 269 and 270, in a pump chamber 280 formed in section 261, are a pair of rotary pump pistons 281 and 282. The pump pistons are of the same cross-section as the motor pistons, but are of considerably greater longitudinal extent as shown. Preferably all the cooperating pistons are arranged slightly out of contact with each other and with their cooperating walls so as to eliminate friction as far as possible.

The lower ends of pistons 281 and 282 have cavities concentric with their respective shafts in which are accommodated the upper ends of bushings 273 and 274. Similar cavities are formed in the upper ends of pistons 281 and 282, these latter cavities receiving cup-shaped elements 283 and 284 which are screwed in threaded bores in section 262, the upper edges of these elements being crenellated to receive a complemental wrench and the lower walls of the said elements being apertured to pass shafts 269 and 270 with a close running fit. Each cup-shaped element 283 and 284 contains a packing unit comprising upper and lower members 285 and 286 connected by jaw teeth and forced apart by a compression spring 287 which, at its lower end, bears against a number of gaskets 288. The upper members of these units are forced against the motor pistons while the lower members bear against the bottom walls of elements 283 and 284.

A pair of pilot gears 289 and 290 are pinned to shafts 269 and 270 respectively in a chamber 291 formed in section 264, these gears serving to maintain the proper angular relation of the motor and pump pistons. Expansion members 292 and 293 set in a wall 294 and in alignment with shafts 269 and 270 respectively bear against balls 295 and 296 disposed in depressions in the upper ends of the said shafts, so that a downward pressure is exerted on the latter counter to the action of springs 287.

Formed in sections 263 and 264 is a passage 297 which serves as an inlet for the hydraulic medium, the lower end of tis passage being on the inlet side of the motor pistons, the outlet passage for the hydraulic medium being designated by the reference numeral 298. The hydraulic medium, which is a lubricating oil, has access to the upper bearing portions of the shaft and to the pilot gears. In order to lubricate the lower ends of the shafts, the lower portion of section 260 is provided with a passage 299 which extends under the shaft ends as particularly shown in Figure 11 and which is connected with the motor chamber by means of a duct 300, Figure 10.

In the inlet side of the pump chamber 280 is formed a cylinder 301 in which is reciprocable a piston 302. A stem 303 projecting from the lower end of the piston is guided by a spider 304 arranged in a cavity 305 in the lower portion of section 260, cavity 305 communicating with the lower end of cylinder 301 through an aperture 306. A compression spring 307 surrounding stem 303 abuts with its upper end against spider 304 and with its lower end against a washer 308 held on the stem by locked nuts 309 threaded on the stem. Spring 307 tends to hold piston 302 in the position illustrated wherein its lower edge seats against the margins of aperture 306, in which position the cylinder closes an opening 310 formed in the lower portion of cylinder 301 and connecting the interior of the latter with the intake side of the pump. The lower end of stem 303 projects through an opening 311 in the bottom wall of section 259 into a well provided by a cap member 312 secured to section 259. Within the well a washer 313 is secured on stem 303 by means of nuts 314 and 315.

A passage 316 formed in sections 262 to 264 serves as intake passage for the pump, the discharge passage being designated by the reference numeral 317. An aperture 318 in section 260 connects the outlet side of pump chamber 280 with a passage 319 formed in section 258 and extending across the latter to cavity 305 in section 260 and also communicating with the interior of cap element 312 by means of aperture 311 through which stem 303 extends.

Upon the supply of pressure fluid to the motor through inlet passage 297, the latter is caused to drive the pump, which withdraws fluid from the selected tank through intake passage 316, discharging the same through discharge passage 317. Upon a backing up of pressure on the discharge side of the pump, caused for example by a predetermined head in the vent pipe of the storage tank to which delivery is being made, piston 302 is moved upwardly against the force of spring 307, thus uncovering opening 310 in cylinder 301 and establishing a bypass so that discharge is discontinued. In the operation of piston 302, washer 313 has a dashpot effect preventing sudden movement of the piston. Adjustment of nuts 308 and consequent adjustment of spring 307 enables the bypass arrangement to be set to become effective upon the occurrence of a predetermined back pressure. No means is necessary to limit upward movement of piston 302, since opening 310 is of size to pass the entire pump output.

Unit 258 is completed by a cap member or header 320, Figures 1, 2 and 3, which is set in an aperture in the top of the wrapper 32 and has a flange 321 resting upon and welded to the latter. Cap member 320 is bolted to section 264 of unit 258 and has passages formed therein registering with passages 297, 298, 316 and 317 of section 264. Passage 316, which is the pump intake passage, is connected through a connection 322 with the rear end of manifold 155. Discharge passage 317 through a connection 323 and a conduit section 324, Figure 2, is connected into the previously described fitting 198, conduit 324 of Figures 1, 2 and 3 corresponding to conduit 196 of Figure 4. A supply conduit 325 for the pressure fluid is led into cap member 320 to the inlet passage 297, an outlet in extension of passage 298 being provided through the cap member and a conduit 326.

Fluid discharge from a selected tank is possible only when the discharge pump is driven and the preferred form of pump as just described is such that when it is inoperative it positively closes the discharge line. Due to this characteristic of the pump and to the provision of the siphon breaker, any siphon discharge is impossible.

I have hereinbefore described, with reference to Figure 4, a selector valve and a control valve, these having been illustrated in Figure 4, for the purpose of simplifying the showing, as separate elements. Preferably these valves are embodied in a unitary structure and are controlled by a common lever which is swingable about one axis to operate one of the valves and about another axis to operate the other valve. Also the arrangement is such that operation of the control valve is impossible before the selector valve has been set. This novel valve arrangement is shown in detail in Figures 13 to 20, its disposition relative to the truck being shown in Figure 1.

Referring to these figures, the combined valve is designated as a whole by the reference numeral 327. The valve casing is made up of sections 328, 329 and 330, Figure 15, these sections being held together by cap screws 331. Section 329 is formed with a frusto-conical chamber 332 tapered toward section 328 and revoluble in this chamber is a selector plug 333. As most clearly shown in Figure 17, the plug 333, which is hollow, has two diametrically opposed extensions 334 and 335, which have a close running fit with the walls of chamber 332, the extensions being provided with longitudinally extending slots 336 and 337. At diametrically opposite points the wall of chamber 332 is provided with openings 338 and 339, which are connected by a passage 340 formed in section 329. Section 329 is provided with a base 341 adapted to be secured to a bracket 342 in the compartment 67 at the rear of the tank 31, Figure 1. The return pipe 326 from the pump driving motor is connected into passage 340 through a port 343, the return line 194 to the tank 249 being connected into passage 340 through a port 344.

Formed in section 329 between openings 338 and 339, opposite passage 340, are six equi-distantly spaced radially directed ports A3 to F3, of which A3 to E3 appear in Figure 14, F3 appearing in Figure 15. For the sake of compactness, the ports are staggered as indicated in Figure 14, the longitudinal extent of the stagger being less than the longitudinal extent of slots 336 and 337 in extensions 334 and 335. Pressure lines A2 to F2, Figures 2, 3 and 4, are connected into ports A3 to F3 respectively.

Plug 333 has a hub portion 345 extending into a chamber 346 of section 330 and has an annular shoulder 347 bearing against a ledge 348 presented by a flanged ring nut 349 threaded into the end of section 330. A packing element comprising sleeve members 350 and 351 interengaged by jaw teeth surrounds hub 345 bearing at one end against a shoulder 352 of the latter and at the other end against ring nut 349. Members 350 and 351 are urged apart by a compression spring 353, which bears at one end against an internal annular rib on member 350 and at the other end against packing gaskets 354, which are urged against an internal annular flange of member 351. An expansible detent member 355 is arranged in a bore in section 330 in position to engage in depressions as at 356 in the rear edge of plug 333, there being six of these depressions respectively engaged when slot 336 is brought into register with one of the ports A3 to F3. In Figures 15 and 17, it should be pointed out, slot 336 is shown as being in register with port F3, while in Figures 13 and 14, plug 333 is assumed to be in its neutral position wherein slot 336 is in register with opening 338 and slot 337 is in register with opening 339.

Hub 345 has an axial bore receiving a shaft 357, there being an enlarged cavity 358 within the hub communicating with chamber 332 by means of a duct 359. Further, hub 345 has a reduced portion 360 projecting outwardly of nut 349, portion 360 having secured thereto by means of a pin 361, the hub portion 362 of an arm 363, Figures 15 and 18 to 20. Arm 363 has a bifurcated end in which is engaged one end of a torsion spring 364 which surrounds the reduced extremity of section 330 and has its other end engaged in a hole in the latter, Figures 15, 19 and 20. Spring 364 acts continuously to hold plug 333 in its neutral position or to return it to such position when it is moved therefrom.

Section 328 comprises a boss portion 365 which projects within plug 333 as most clearly shown in Figure 15, reference also being had to Figure 16, the boss portion being provided with a bore 366 coaxial with plug 333. The boss portion is supported by walls 367 and 368, which define a passage 369 debouching into a port 370 into which the line 326 to the hydraulic pump driving motor is connected. A piston 371 slidable in bore 366 is integrally connected through an intermediate reduced portion with a valve disc 372, which, as shown in Figure 15, is seated on a ledge 373 provided in the outer end of boss 365. This piston and valve unit has a through bore which receives the rear end of shaft 357, connection being made by means of a pin 374. A shaft 375, which projects within the rearward end of the piston and valve unit, is secured thereto by a pin 376. Shafts 357 and 375 constitute, in effect, a single shaft jointed for convenience of assembly. A thimble 377 has a flange 378 lying against the external face of section 328, the thimble extending within the said section and having a reduced extremity 379 extending within an annular cavity within piston 371. The rear end of shaft 375 is threaded and has nuts 380 locked thereon and forming an abutment for one end of a compression spring 381, which at its other end bears against a seat provided in thimble 377. A closure cap 382 has a flange 383 overlying flange 378 and secured through the latter to section 328 by means of cap screws 384. Finally, section 328 has a port 385 which, through a passage 386, is in communication with chamber 332 in section 329. The pressure supply conduit 191 from the master pump, Figures 3 and 4, is connected into port 385, so that upon operation of the pump, chamber 332 is filled with the pressure fluid which, in the position of parts shown in Figure 15, is shut off from port 370 by valve disc 372. In the neutral position of the plug 333 the pressure fluid flows through passage 340 to the exhaust line 194.

Hub 362, Figures 15 and 18 to 20, has parallel sides engaged by the parallel inner surfaces of arms 387 of a lever 388, arms 387 being pivoted at their extremity to hub 362 by means of a bolt 389. When lever 388 is swung about the axis of shaft 357, it carries with it hub 362 and therewith through its hub portion 345, the valve plug 333, to bring the latter to its desired position of adjustment. Lever 388 is also swingable about the axis of bolt 389 relative to hub 362 for a purpose which will now be described.

Shaft 357 is slightly reduced beyond the extension 360 of hub 345 and has revolubly mounted thereon in concentric relation thereto a cup-shaped element 390, the end wall of the latter, which is adjacent extension 360, having a flanged aperture 391 receiving the reduced portion of shaft 357 and marginally abutting the shoulder which exists on the shaft by reason of its reduction. Within the member 390 a ring 392 is pinned to the shaft, and interposed between this ring and a ring 393 which abuts the end wall of member 390 is a readily fusible ring 394. Preferably the ends of ring 394 are tapered and the adjacent ends of rings 392 and 393 are complementarily undercut, as shown.

Arms 395 and 396 are coaxially pivoted to the lever arms 387 by means of cap screws 397 and 398, which latter are surrounded by spacing collars 399 and 400, which pass loosely through elongated apertures in arms 395 and 396. Interposed between the heads of screws 397 and 398 and washers 401 and 402 which bear against arms 395 and 396 are compression springs 403 and 404, these latter tending normally to hold the pivoted ends of arms 395 and 396 flatly against the parallel underlying surfaces of lever arms 387.

Member 390 is finished with opposite parallel external surfaces as most clearly shown in Figure 20, these surfaces being bisected respectively by slots 405 and 406 which run to the outer extremity of member 390. Member 390 has lugs as at 407 and 408 at its outer extremity at each side of the slots. The second lug at slot 406 is shown at 409, Figure 19.

A thimble 410 has a bore 411 in which is received in sliding relation the extremity of shaft 357, the thimble extending within member 390 and having a cylindrical enlargement 412 guided by the inner surfaces of member 390. Enlargement 412 is provided with an annular groove 413 bounded at one side by a conical wall 414 as most clearly shown in Figures 15 and 18. As will be seen, the conical wall 414 is at that side of groove 413 nearest the outer extremity of the thimble.

The free extremities of arm 395 and 396 are mutually approached to rest flatly against the plane surfaces of member 390 with the ends of the arms substantially in abutment with the lugs as at 407 and 408 at the end of member 390. Studs 415 and 416 fixed in the free extremities of arms 395 and 396 pass through slots 405 and 406 of member 390 into groove 413 of thimble 410. A compression spring 417 interposed between a washer 418 bearing against ring 392 and a wall 419 of thimble 410, holds the rear wall of groove 413 against pins 415 and 416 when the latter are in their normal position, which is the position shown in full lines in Figure 18. With the parts thus disposed, thimble 410 projects beyond the extremity of shaft 357. Wall 419 of thimble 410 is at the inner end of a bore enlargement 411′ within the outer end of which elements 392 and 394 are positioned.

In Figure 19, lever 388 is shown as being swung to the right or away from section 330. Arms 395 and 396, being engaged behind the lugs of member 390 in the manner shown in Figures 18 and 19, carry the said member rearwardly. The end wall of member 390, acting through rings 392, 393 and 394, causes shaft 357 to be axially displaced against the force of spring 381, thus unseating valve disc 372 and placing inlet port 385 in communication with outlet port 370, so that pressure fluid is supplied to the pump driving motor. Upon release of handle 388, valve disc 372 is immediately seated due to longitudinal displacement of shaft 357 under the force of spring 381.

A guard 420 is secured to section 330 by means of cap screws 421, these screws being confined to the upper portion of the guard. The lower substantially semi-circular portion of the guard projects back towards lever 388 in proximity to the path of swing of the latter about the axis of shaft 357 when the lever is in its normal position, shown in Figures 14 and 15, with respect to pivot bolt 389. With plug 333 in its neutral position, lever 388 occupies the off position shown in Figure 13, wherein it lies behind a solid edge of the guard and hence is prevented by the latter from being swung about the axis of bolt 389. When the handle is swung about the axis of shaft 357 to any one of the six positions indicated in Figure 13, it is in register with one of the slots 422 provided in the guard, so that it may be swung rearwardly to unseat valve discs 372.

With handle 388 in position No. 1, slot 336 of plug 333 will be in register with port A3 of section 329 and, accordingly, the suction line from tank A will be opened. With the handle in position No. 2, the suction line from tank B will be opened, and so forth. It will be evident that unless handle 388 is in one of the six positions indicated so as to open the suction line of a selected tank, it cannot be swung about the axis of bolt 389 to unseat valve disc 372 and initiate operation of the pump motor. If the pump motor is placed in operation by movement of lever 388, it follows that the suction line from one of the tank compartments must have been opened.

Thimble 410 projects through an opening provided in guard 420 in the normal position of parts and will be moved outwardly to a further extent when lever 388 is swung to place the pump motor in operation. It will be evident that to hold valve disc 372 unseated, it is necessary that the operator hold lever 388 against the force of spring 381, the spring seating the valve disc to stop the pump motor immediately upon release of handle 388. Since a careless operator may block or tie handle 388 in such position as to hold valve disc 372 unseated, the safety release controlled by thimble 410 has been provided. A blow on the end of the thimble will cause the surface 414 to cam studs 415 and 416 outwardly, disengaging the ends of arms 395 and 396 from the lugs 407 and 408 so that valve disc 372 is immediately seated due to the action of spring 381.

Compartment 67 is provided with a door 423, which is adapted to gravitate to closed position, but which may be held in open position by means of a link 424 pivoted to the door and adapted to have its lower end supported on a readily fusible abutment 425. The position of the combined valve 327 is such that when thimble 410 is projected due to the actuation of lever 388, the end of the thimble will be struck by door 423 in closing. Thus, assuming lever 388 to be blocked with valve disc 372 unseated, any rise in temperature which will cause fusion of abutment 425 will permit door 423 to close and by striking the end of thimble 410 to enable valve disc 372 to seat. Further, any rise in temperature which will cause the fusion of ring 394 will permit shaft 357 to move rearwardly relative to member 390 to seat valve disc 372.

Thus, under normal conditions, springs 364 and 381 act to hold the selector and control valves in off position and the control valve cannot be actuated except subssequent to actuation of the selector valve. Even if the purpose of these provisions is ignored by a careless operator cutting off of the pump motor will occur automatically under the conditions described above.

Pressures within valve 327 are equalized as far as possible on the movable valve parts, so as to facilitate operation of the latter. Spring 353 acts against the force of the pressure fluid on the face of hub portions 345 of the selector plug and assures proper contact of extensions 334 and 335 with the inner wall of chamber 332. When plug 333 is in its neutral position, slots 336 and 337 are in register with openings 338 and 339 as has been explained, the reactions on the plug thus being balanced. When slot 336 is brought into register with any one of the ports A3 to F3, slot 337 overlies an imperforate wall portion 332' of chamber 332, so that again transaxial stresses on the plug are substantially balanced.

The rear end of piston 371 is in a chamber 328' of section 328, this chamber communicating with port 385. Consequently the same pressure exists at the rear end of piston 371 as at its forward end which is in chamber 332. The chamber which houses spring 381 is in communication with passage 340 through a duct 340', Figure 15.

From the above description, it will be seen that I have provided a tank truck of improved design and a discharge system embodying to a maximum degree features of efficiency and safety. I do not limit myself to the exact construction shown and described, since many variations are possible within the scope of the invention as defined in the following claims.

I claim:—

1. In a tank truck, a plurality of tanks, a pump, conduits connecting the tanks with the intake side of the pump, a valve in each conduit normally closing the same, hydraulically actuated means associated with each valve for controlling the same, a source of fluid under pressure, means including a selector valve operable to direct fluid from the source to a selected valve controlling means, a hydraulic motor for driving the pump, a pressure line connecting the source and motor, a valve operable to control flow through said pressure line to the motor, and a discharge conduit in connection with the discharge side of the pump.

2. In a tank truck, a plurality of tanks, a pump, conduits connecting the tanks with the intake side of the pump, a valve in each conduit normally closing the same, hydraulically actuated means associated with each valve for controlling the same, a source of fluid under pressure, means including a selector valve operable to direct fluid from the source to a selected valve controlling the means, a hydraulic motor for driving the pump, a pressure line connecting the source and motor, a valve operable to control flow through said pressure line to the motor, and a discharge conduit in connection with the discharge side of the pump, said selector valve and motor control valve being both disposed at the rear end of the truck and having a common operating lever which is swingable about one axis to effect adjustment of the selector valve and swingable about another axis to effect adjustment of the motor control valve.

3. In a tank truck, a plurality of tanks, a pump, conduits connecting the tanks with the intake side of the pump, a valve in each conduit normally closing the same, hydraulically actuated means associated with each valve for controlling the same, a source of fluid under pressure, means including a selector valve operable to direct fluid from the source to a selected valve controlling means, a hydraulic motor for driving the pump, a pressure line connecting the source and motor, a valve operable to control flow through said pressure line to the motor, and a discharge conduit in connection with the discharge side of the pump, the pump being designed to prevent flow therethrough when at rest.

4. In a tank truck, a plurality of tanks, a pump, conduits connecting the tanks with the intake side of the pump, a valve in each conduit normally closing the same, hydraulically actuated means associated with each valve for controlling the same, a source of fluid under pressure, means including a selector valve operable to direct fluid from the source to a selected valve controlling means, a hydraulic motor for driving the pump, a pressure line connecting the source and motor, a valve operable to control flow through said pressure line to the motor, a discharge conduit in connection with the discharge side of the pump, said discharge conduit having a depending portion, and a siphon breaker at the top of said depending portion.

5. In a tank truck, a plurality of tanks, a pump, conduits connecting the tanks with the intake side of the pump, a valve in each conduit normally closing the same, hydraulically actuated means associated with each valve for controlling the same, a source of fluid under pressure, means including a selector valve operable to direct fluid from the source to a selected valve controlling means, a hydraulic motor for driving the pump, a pressure line connecting the source and motor, a valve operable to control flow through said pressure line to the motor, a discharge conduit in connection with the discharge side of the pump, the pump being designed to prevent flow therethrough when at rest, said discharge conduit having a depending portion, and a siphon breaker at the top of said depending portion.

6. In a tank truck, a plurality of tanks, a pump, conduits connecting the tanks with the intake side of the pump, a valve in each conduit normally closing the same, pressure responsive means in connection with each valve for controlling the same, a selector valve including a casing and a rotary selector element in the casing, pressure lines connecting the casing and said pressure responsive means, a source of fluid under pressure in connection with said casing and adapted to be connected with any one of said pressure lines upon adjustment of said selector element, a hydraulic drive motor for said pump, a connection between said source and motor and including said casing, a motor control valve in said casing, a common operating member for said selector valve and said motor control valve, and a discharge conduit in connection with the discharge side of the pump.

7. In a tank truck, a plurality of tanks, a pump, conduits connecting the tanks with the intake side of the pump, a valve in each conduit normally closing the same, pressure responsive means in connection with each valve for controlling the same, a selector valve including a casing and a rotary selector element in the casing, pressure lines connecting the casing and said pressure responsive means, a source of fluid under pressure in connection with said casing and adapted to be connected with any one of said pressure lines upon adjustment of said selector element, a hydraulic drive motor for said pump, a connection between said source and motor, a valve for controlling flow through said last named connection, a common operating lever for said rotary selector element and said motor control valve, said lever being swingable about the axis of said selector element to effect adjustment of said element and being swingable about another axis to effect adjustment of said control valve, and a discharge conduit in connection with the discharge side of the pump.

8. In a tank truck, a plurality of tanks, a suction manifold having connections with said tanks, hydraulically operated means for controlling the connection to a selected tank, a pump at the discharge end of said manifold, a hydraulic motor for driving said pump, and means operable to control selectively the operation of said hydraulically operated means and to control the operation of said motor.

9. In a tank truck, a tank, means for emptying the tank comprising a pump and a hydraulic pump driving motor positioned within the tank, a source of fluid under pressure, said source being external of the tank, a supply conduit connecting said source and said motor, an exhaust conduit leading from said motor to the exterior of the tank, and a discharge conduit leading from said pump to the exterior of the tank, said conduits leading through the top of the tank.

10. In a tank truck, a plurality of tanks, a pump in one end of said tanks, conduits connecting the tanks with the intake side of the pump, a valve in each of said conduits normally closing the same, hydraulically actuatable means associated with each of said valves for controlling the same, said last named means being disposed in the respective tanks, a source of fluid under pressure, said source being external of the tanks, a selector valve external of the tanks, lines connecting said selector valve with the hydraulically actuatable means respectively, said selector valve being operable to direct fluid from the source to a selected hydraulically actuable means, a hydraulic motor for driving the pump and positioned in the same tank with the latter, a pressure line connecting said source and motor, an exhaust line for the motor leading from the latter to the exterior of the tank, a discharge conduit leading from the discharge side of the pump to a point external of the tanks, and a valve operable to control flow through said pressure line to the motor.

11. In a tank truck, a plurality of tanks, a pump in one of said tanks, conduits connecting the tanks with the intake side of the pump, a valve in each of said conduits normally closing the same, hydraulically actuable means associated with each of said valves for controlling the same, said last named means being disposed in the respective tanks, a source of fluid under pressure, said source being external of the tanks, a selector valve external of the tanks, lines connecting said selector valve with the hydraulically actuatable means respectively, said selector valve being operable to direct fluid from the source to a selected hydraulically actuatable means, a hydraulic motor for driving the pump and positioned in the same tank with the latter, a pressure line connecting said source and motor, an exhaust line for the motor leading from the latter to the exterior of the tank, a discharge conduit leading from the discharge side of the pump to a point external of the tanks, and a valve operable to control flow through said pressure line to the motor, all of said lines and said discharge conduit being lead to their associated devices through the tops of the tanks.

12. For use in apparatus of the class described, a valve comprising a casing, a shaft slidable in said casing, a valve disc on said shaft movable therewith to close or open a passage in said casing, a selector valve plug rotatable in said casing to connect an inlet opening with any one of a plurality of outlet openings in said casing, a lever in pivotal connection with said plug on an axis perpendicular to an axial plane of said shaft, said lever being rotatable about the axis of said shaft to rotate said valve plug, and connections between said lever and shaft whereby said shaft is axially shiftable upon movement of said lever about said pivotal connection, a return spring for said shaft, and means operable to release said last named connections whereby the shaft may be returned to seat said valve disc while said lever remains in operated position.

13. For use in apparatus of the class described, a valve comprising a casing, a shaft slidable in said casing, a valve disc on said shaft movable therewith to close or open a passage in said casing, a selector valve plug rotatable in said casing to connect an inlet opening with any one of a plurality of outlet openings in said casing, a lever in pivotal connection with said plug on an axis perpendicular to an axial plane of said shaft, said lever being rotatable about the axis of said shaft to rotate said valve plug, and connections between said lever and shaft whereby said shaft is axially shiftable upon movement of said lever about said pivotal connection, a return spring for said shaft, and means operable to release said last named connections whereby the shaft may be returned to seat said valve disc while said lever remains in operated position, said last named means comprising a plunger slidable axially of said shaft.

14. For use in apparatus of the class described, a valve comprising a casing, a shaft slidable in said casing, a valve disc on said shaft movable therewith to close or open a passage in said casing, a selector valve plug rotatable in said casing to connect an inlet opening with any one of a plurality of outlet openings in said casing, independently acting spring means urging said valve disc and valve plug respectively to seating position, a lever in pivotal connection with said plug on an axis perpendicular to an axial plane of said shaft, said lever being rotatable about the axis of said shaft to rotate said valve plug, and connections between said lever and shaft whereby said shaft is axially shiftable upon movement of said lever about said pivotal connection.

15. In a tank truck, a plurality of tanks, a pump, connections between the tanks and the intake side of the pump, hydraulically controllable valves in said connections, a hydraulic motor for driving said pump, a source of fluid under pressure, and means for selectively associating said source with said hydraulically controllable valves and for associating said source with said motor.

16. In a tank truck, a plurality of tanks, a pump, connections between the tanks and the intake side of the pump, hydraulically controllable valves in said connections, a hydraulic motor for driving said pump, a source of fluid under pressure, and means for selectively associating said source with said hydraulically controllable valves and for associating said source with said motor, said last named means comprising a shaft rotatable to a selecting position as regards said hydraulically controllable valves and longitudinally displaceable to direct flow to said valves and motor.

17. In a tank truck, a plurality of tanks, a pump, connections between the tanks and the intake side of the pump, hydraulically controllable valves in said connections, a hydraulic motor for driving said pump, a source of fluid under pressure, and means for selectively associating said source with said hydraulically controllable valves and for associating said source with said motor, said last named means comprising a shaft rotatable to a selecting position as regards said hydraulically controllable valves and longitudinally displaceable to direct flow simultaneously to said valves and motor.

18. For use in apparatus of the class described, a valve comprising a casing, a shaft slidable in said casing, a valve disc on said shaft movable therewith to close or open a passage in said casing, a selector, valve plug rotatable in said casing to connect an inlet opening with any one of a plurality of outlet openings in said casing, a lever in pivotal connection with said plug on an axis perpendicular to an axial plane of said shaft, said lever being rotatable about the axis of said shaft to rotate said valve plug, connections between said lever and shaft whereby said shaft is axially shiftable upon movement of said lever about said pivotal connection, and a guard provided with slots spaced as the various angular selecting positions of said plug with reference to said outlet openings and into which said lever is swingable to shift said shaft only when the plug is in one of said selecting positions.

19. An automotive vehicle truck having a tank thereon, of a pump and motor unit supported in said tank, means for conducting liquid to and from said motor, means for connecting the pump to the interior and exterior of the tank, a pump exterior of said tank for supplying fluid to said liquid conducting means, and means for driving said exterior pump from the engine of said truck.

20. An automotive vehicle truck having a tank thereon, of a pump and motor unit supported in said tank, means for conducting liquid to and from said motor, conducting means for connecting the pump to the interior and exterior of said tank, a pump exterior of said tank for supplying fluid to the liquid conduction means of said motor, means for driving said pump from the engine of said truck, and a by-pass valve in the conducting means of the first said pump for shunting the liquid about the pump of the unit when the pressure of the liquid pumped thereby exceeds a predetermined amount.

21. The combination with an automobile truck having a tank thereon, of a header on said tank having two liquid conducting circuits therein, a motor and pump operatively connected and supported inside of said tank on said header to have a circuit connected to said motor and said pump, respectively, and means for supplying a fluid to said motor for effecting the operation of said pump.

22. The combination with an automotive tank truck, of a pump, a fluid circuit leading to and from said pump, a conduit by-passing said circuit across said pump, a pressure valve interconnecting said by-pass circuit to the circuit leading from the pump and opened when the pressure in the last-mentioned circuit exceeds a predetermined amount, a motor for driving said pump, a second pump of greater capacity than said motor for circulating a fluid through said motor and driving said motor at high speed, and a power take-off device connectible to the transmission of the truck for driving said second pump.

23. An automotive vehicle having a tank with a plurality of compartments thereon, a can-compartment in the rear of said tank, a motor and pump, a delivery conduit extending from said pump, a manifold connected to said pump and extending along said tank, intake conduits each having a valve therein connected to said manifold, means in said can-compartment for controlling the position of said valves, and a pump driven by the engine of the vehicle for supplying a fluid to said motor.

24. An automotive vehicle having a tank thereon divided into a plurality of compartments, a manifold on said tank interconnectible through valves to said compartments, a motor and pump unit, the pump of said unit being connected to the manifold, a delivery conduit connected to said pump, and a second pump of greater capacity than said motor driven by the vehicle engine for supplying fluid to said motor, and means for selectively connecting the pump of the unit through the manifold to any of said compartments.

25. An automotive truck having a tank thereon provided with a plurality of compartments, a can-compartment disposed in the rear of said tank, a motor and pump unit, the pump of which is selectively connectible to said tank compartments from said can-compartment, and a pump driven by the engine of the truck for delivering a fluid to said motor, said second pump being of greater capacity than said motor for driving said motor at a high speed.

26. An automotive truck having a tank thereon provided with a plurality of compartments, a can-compartment disposed in the rear of said tank, a motor and pump unit, the pump of which is selectively connectible to said tank compartments from said can-compartment, a pump driven by the engine of the truck for delivering a fluid to said motor, said second pump being of greater capacity than said motor for driving said motor at a high speed, a delivery conductor connected to the pump of said motor and pump unit, and a by-pass conduit extending around said pump of the unit and having a valve actuated by the pressure of the fluid in the delivery conduit for by-passing the fluid about the pump of the unit when said pressure exceeds a predetermined amount.

FRANK A. HOLBY.